United States Patent
Desarda et al.

(10) Patent No.: US 11,882,107 B2
(45) Date of Patent: Jan. 23, 2024

(54) APPLICATION SINGLE SIGN-ON DETERMINATIONS BASED ON INTELLIGENT TRACES

(71) Applicant: Microsoft Technology Licensing, LLC, Redmond, WA (US)

(72) Inventors: Jeevan Suresh Desarda, Bothell, WA (US); Mayukh Ray, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 184 days.

(21) Appl. No.: 17/317,525

(22) Filed: May 11, 2021

(65) Prior Publication Data

US 2022/0368691 A1  Nov. 17, 2022

(51) Int. Cl.
H04L 9/40 (2022.01)

(52) U.S. Cl.
CPC ...... *H04L 63/0815* (2013.01); *H04L 63/0428* (2013.01); *H04L 63/083* (2013.01); *H04L 63/20* (2013.01)

(58) Field of Classification Search
CPC ............ H04L 63/0815; H04L 63/0428; H04L 63/083; H04L 63/20
See application file for complete search history.

(56) References Cited

U.S. PATENT DOCUMENTS

| | | | | |
|---|---|---|---|---|
| 7,512,933 B1* | 3/2009 | Tortosa | ............... | G06F 11/3672 717/124 |
| 7,822,825 B2* | 10/2010 | De Luca | ............. | H04L 67/1097 709/219 |
| 10,783,237 B2* | 9/2020 | Chen | ...................... | G06Q 10/00 |
| 2004/0098640 A1 | 5/2004 | Smith | | |
| 2011/0162046 A1* | 6/2011 | Forster | .................. | H04L 9/3271 726/4 |
| 2012/0204249 A1 | 8/2012 | Gonzalez et al. | | |
| 2013/0104041 A1* | 4/2013 | Seshagiri | ............ | G06F 11/3414 715/704 |
| 2016/0088000 A1* | 3/2016 | Siva Kumar | ....... | H04L 63/1416 726/23 |
| 2017/0337476 A1* | 11/2017 | Gordon | ............ | H04N 21/44231 |
| 2018/0004283 A1* | 1/2018 | Mathey-Owens | .......................... | G06F 3/04842 |

OTHER PUBLICATIONS

"International Search Report and Written Opinion Issued in PCT Application No. PCT/US22/025659", dated Jul. 20, 2022, 10 Pages.

* cited by examiner

*Primary Examiner* — Chau Le
(74) *Attorney, Agent, or Firm* — Mannava & Kang, P.C.

(57) ABSTRACT

According to examples, an apparatus may include a processor that may determine that an application was accessed through a portal. Based on a determination that the application was accessed through the portal, the processor may determine whether a first credential type or a second credential type was supplied to access the application, in which the first credential type may include a set of personal credentials of a user and the second credential type may include a set of single sign-on credentials that the user may use to access multiple applications. The processor may also output a trace that may indicate an identification of the application that was accessed and the type of the credential supplied to access the application, in which a backed entity may analyze the data included in the trace.

16 Claims, 4 Drawing Sheets

APPLICATION SINGLE SIGN-ON DETERMINATIONS BASED ON INTELLIGENT TRACES

BACKGROUND

Traces corresponding to applications, such as websites, accessed through apparatuses may be tracked. The traces may be analyzed for troubleshooting, debugging, business analysis, security improvements, data protection, etc., of the applications.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
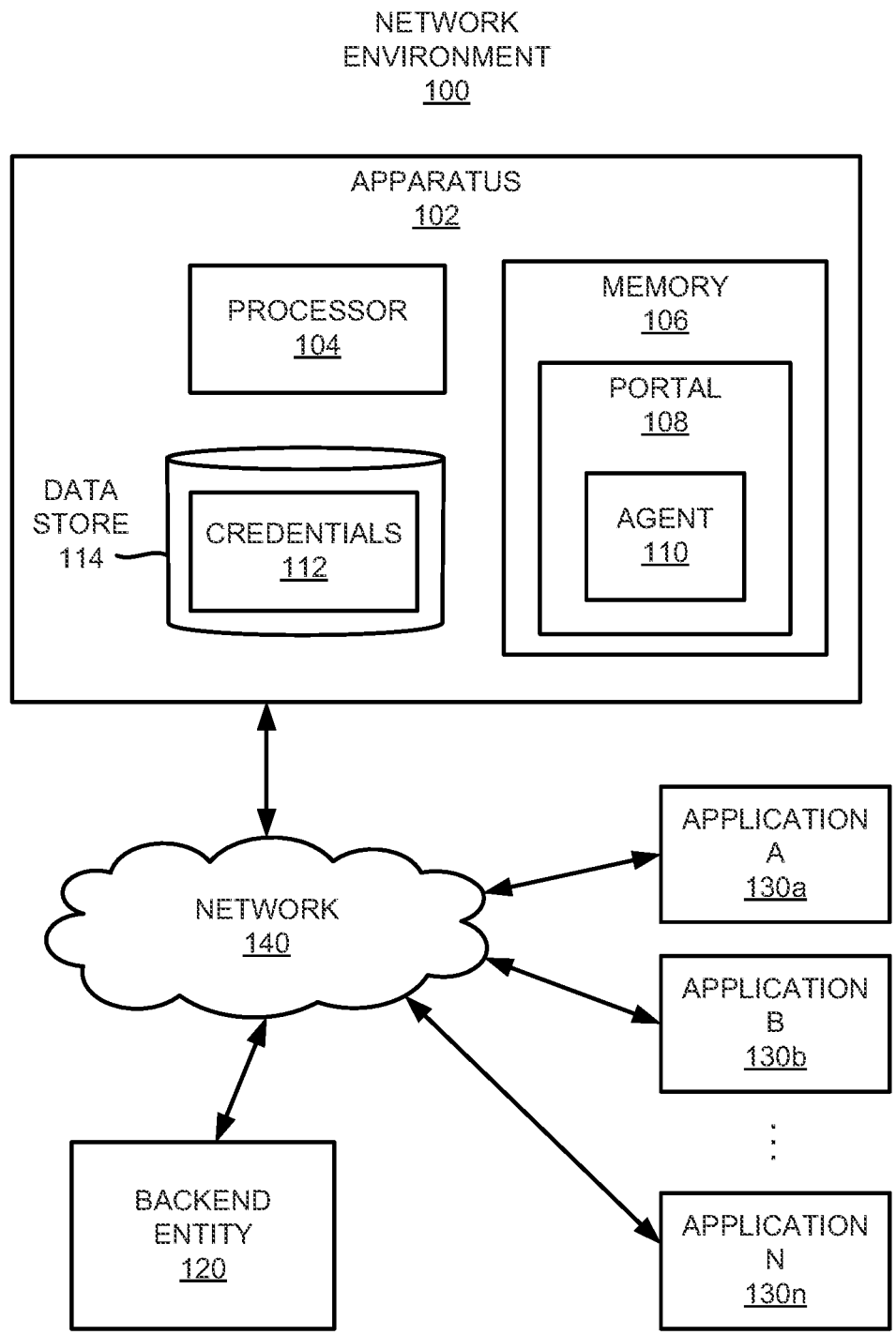
FIG. 1 shows a block diagram of a network environment, in which an apparatus may determine a type of credential that was supplied to access an application and to output a trace that indicates an identification of the application that was accessed and the type of the credential used, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer-readable media in which a processor may determine that an application was accessed through a portal and may determine whether a first credential type or a second credential type was supplied to access the application. The first credential type may include set of personal credentials of a user, e.g., a set of personal credentials that the user may enter to access a particular application. The user may enter credentials of the first credential type each time the user access a respective application. The second credential type may include a set of single sign-on credentials that the user may use to access multiple applications. The use of the single sign-on credentials may enable the user to access the multiple applications without requiring that the user sign-on to each of the multiple applications through use of credentials that may be individualized for the multiple applications. In addition, an organizational administrator may set up the single sign-on credentials, which may be governed by policies laid by the organization, which may improve the strength of the credentials, e.g., the strengths of the passwords used in the single sign-on credentials.

The processor may also output a trace that indicates an identification of the application that was accessed and the type of the credential entered or supplied to access the application. In some examples, the processor may output the traces for certain applications that are accessed through the portal, for instance, in an intelligent manner. In other words, instead of outputting traces for all of the applications accessed through the portal, the processor may selectively output the traces for some of the applications accessed through the portal. The user and/or a backend entity may define the applications for which the traces are to be outputted. As used herein, a trace may be a record or log corresponding to the identification of the application that was accessed and the type of credential that was entered through the portal.

In some examples, the processor may determine that a user provided sensitive information, such as personally identifiable information, to the application. In these examples, the processor may avoid outputting the sensitive information such as by removing the sensitive information from the outputted trace and/or by obfuscating the sensitive information and outputting the obfuscated sensitive information in the outputted trace. As a result, the sensitive information may not readily be identified from the outputted trace, which may protect the sensitive information from access by malicious actors.

According to examples, the processor may output the trace to a backend entity that may gather similar types of traces from multiple apparatuses. The backend entity, or an administrator, IT personnel, or the like, that may access the backend entity, may analyze the traces and may make determinations as to which applications are to be accessible through the single sign-on based on the gathered traces from the multiple apparatuses based on the analysis. That is, for instance, a determination may be made as to which applications users are accessing via their personal credentials. In addition, if it is determined that a certain number of users are accessing a certain application in this manner, the backend entity may cause the certain application to be included to be accessible through entry of their single sign-on credentials.

In many instances, access to applications through use of personal credentials may be less secure than access to the applications through entry of the single sign-on credentials. This may occur because the user name and passwords that users may use as personal credentials may be less secure than the user names and passwords that the user may use as the single sign-on credentials due to, for instance, additional restrictions that organizations may place on the single sign-on credentials. The use of single sign-on credentials may also enable organizations to analyze a root cause of failure when entry of the signal sign-on credentials fails to result in access to a particular application to which the credential entry is supposed to enable access. Additionally, organizations may better track the applications that users access through use of their single sign-on credentials, which may enable the organizations to be better protected against malicious actors. However, enabling access to a large number of applications through the single sign-on credentials may make tracking of the applications more difficult, processing resource consumption intensive, and time consuming.

Through implementation of the features of the present disclosure, applications may selectively be tracked such that traces pertaining to all of the applications accessed through a portal in an application may not be communicated to a backend entity. Instead, traces pertaining to selected ones of the accessed applications may be communicated to the backend entity, which may reduce communication of unnecessary or irrelevant information. This may reduce the amount of network bandwidth used to communicate the traces as well as the amount of processing and power resources consumed by the backend entity, e.g., a processor of the backend entity, in determining which applications are to be accessed through entry of the single sign-on credentials. In addition, sensitive information, such as personally identifiable information, may be removed from the traces and as such, the communication of the traces may provide greater security than communication of emails, attachments, via shared drives, and/or the like.

Figure 2:
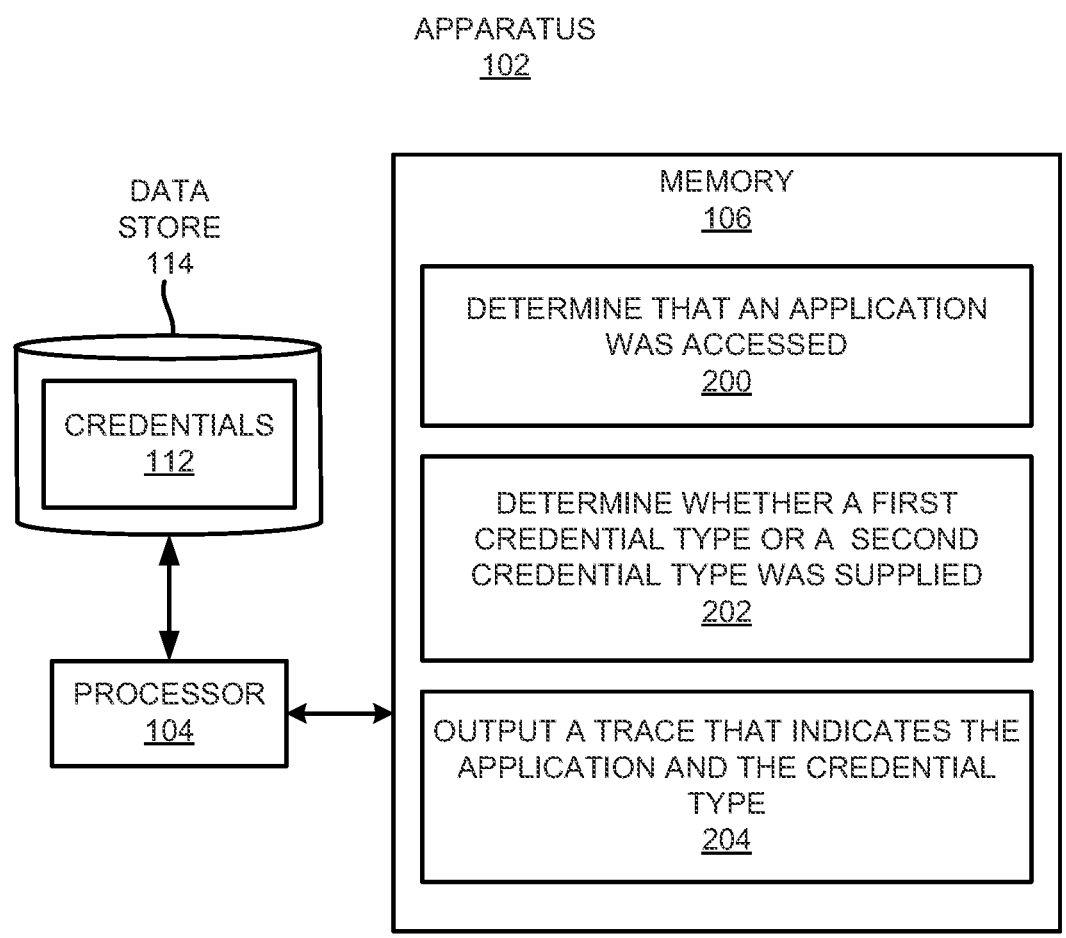
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may determine a type of credential that was supplied to access an application and to output a trace that indicates an identification of the application that was accessed and the type of the credential used, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 may include additional features and that some of the features described herein may be removed and/or modified without departing from the scopes of the network environment 100 and/or the apparatus 102.

As shown in FIG. 1, the network environment 100 may include the apparatus 102 and a backend entity 120. The apparatus 102 may be any type of computing device through which a user may access applications 130a-130n, in which the variable "n" may represent a value greater than one. The apparatus 102 may be any of a client computing device, a laptop computer, a tablet computer, a smartphone, and/or the like. The backend entity 120 may be a computing device, a server, and/or the like, of an administrator, an information technology officer, a technician, and/or like, of an organization. According to examples, and as discussed herein, the backend entity 120 may analyze a trace received from the apparatus 102 and manage and/or be used to manage access to certain ones of the applications 130a-130n through implementation of a single sign-on scheme based on the analysis of the trace. The management of access to the applications 130a-130n may include the addition and/or removal of applications 130a-130n that users may access through entry of the single sign-on credentials.

The apparatus 102 may communicate with the backend entity 120 and the applications 130a-130n through a network 140, which may be a local area network, a wide area network, the Internet, and/or the like. By way of example, the apparatus 102 may communicate with the backend entity 120 through either or both of a local area network and the Internet. In addition, the apparatus 102 may access the applications 130a-130n via the Internet. The network environment 100 may include any number of similar apparatuses 102 that the user or multiple users may use to access the applications 130a-130n. The network environment 100 may also or alternatively include any number of similar backend entities 120.

In some examples, the apparatus 102 may have stored thereon instructions, that when executed, may cause a portal 108, such as a web browser, a web portal, and/or the like, through which a user of the apparatus 102 may access the applications 130a-130n through the network 140 to be displayed on the apparatus 102 or a screen connected to the apparatus 102. Users may use the portal 108 to access the applications 130a-130n, e.g., websites, services, and/or the like. In some examples, the applications 130a-130n may be any web-based applications for which users may provide credentials to access the applications 130a-130n. For instance, the applications 130a-130n may be social media websites, business media websites, banking websites, organization-specific websites, document management websites, work productivity websites, and/or the like.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-204 that the processor 104 may execute. Although the instructions 200-204 are described herein as being stored on the memory 106 and may thus include a set of machine-readable instructions, the apparatus 102 may include hardware logic blocks that may perform functions similar to the instructions 200-204. For instance, the processor 104 may include hardware components that may execute the instructions 200-204. In other examples, the apparatus 102 may include a combination of instructions and hardware logic blocks to implement or execute functions corresponding to the instructions 200-204. In any of these examples, the processor 104 may implement the hardware logic blocks and/or execute the instructions 200-204. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to determine that an application 130*a* was accessed through a portal 108. As discussed herein, the portal 108 may be a web browser or other type of portal that may be displayed on the apparatus 102 or a screen connected to the apparatus 102. In some examples, an agent 110 on the portal 108 may track the applications 130*a*-130*n* that are accessed through the portal 108. The agent 110 may be a set of instructions, such as a plug-in, that may have been added to, e.g., installed on, the portal 108 or an application that is integrated with, e.g., is a utility of, the portal 108. In some examples, the agent 110 may be activated and deactivated by a user. Thus, for instance, a user may activate the agent 110 to cause the applications 130*a*-130*n* accessed through the portal 108 to be tracked and may deactivate the agent 110 to prevent the tracking of the accessed applications 130*a*-130*n*. The processor 104 may thus determine that the application 130*a* was accessed through the portal 108 from the agent 110 while the agent 110 is in an activated state.

In some examples, the agent 110 may normally be in the inactivated state. In these examples, the user may activate the agent 110 when tracking of the applications 130*a*-130*n* that the user accesses is desired. For instance, the user may activate the agent 110 when the user experiences issues with a computing device and/or an application 130*a* and such that the user activities with respect to the computing device and/or the application 130*a* may be tracked. In other examples, the agent 110 may normally be in the activated state and the user may deactivate the agent 110 when the applications 130*a*-130*n* are not to be tracked.

The processor 104 may execute the instructions 202 to, based on a determination that the application 130*a* was accessed through the portal 108, determine whether a first credential type or a second credential type was supplied to access the application 130*a*. For instance, the agent 110 may track the credentials 112 that the user entered to access or otherwise provided to the application 130*a* and may store the credentials 112 in a data store 114. The data store 114 may be a Random Access memory (RAM), an Electrically Erasable Programmable Read-Only Memory (EEPROM), a storage device, or the like. The processor 104 may access the tracked credentials 112 from the data store 114 and may determine whether the credentials 112 are of the first credential type, e.g., includes a set of personal credentials of a user or are of the second credential type, e.g., a set of single sign-on credentials. The processor 104 may make this determination in any of a number of various manners, e.g., may compare the credentials 112 to known credentials, may compare the credentials 112 to a known format of the first credential type or the second credential type, or the like. For instance, the processor 104 may determine that an application 130*a* is using plain credentials or that the credentials used by the application 130*a* are associated with an identity provider. In some examples, the processor 104 may not store the credentials supplied by the user, but may only detect signals that the credentials have been entered and may determine the type of the credentials from the detected signals.

The first credential type may include a set of personal credentials, such as, a personal user name, a personal password, and/or the like. The personal credentials provided to the applications 130*a*-130*n* may be the same or may differ from each other. In instances in which the user enters credentials 112 of the first credential type to access an application 130*a*, the backend entity 120 may not be aware that the user accessed the application 130*a*. In these instances, the devices in the network environment 100 may have a greater vulnerability to attacks due to the lack of awareness by the backend entity 120 of the access to the application 130*a*. Additionally, the personal credentials used by the user to access the application 130*a* may not be as secure as those provisioned by the organization as the single sign-on credentials and thus, the personal credentials may have greater vulnerability to malicious actors than the single sign-on credentials.

Alternatively, the user may provide a second credential type of credentials 112 to access the application 130*a*. The second credential type may include a set of single sign-on credentials, e.g., usernames, passwords, pin numbers, user identifications, and/or the like, that the user may use to access multiple applications 130*a*-130*n* through input of the single sign-on credentials. The single sign-on credentials may be credentials that may comply with provisions set forth by an organization (e.g., length, character, case, etc., provisions) and the organization may use to enable the user to access the multiple applications 130*a*-130*n* with the entry of the single sign-on credentials.

For example, an organization, such as a business, a university, a religious organization, and/or the like, may have instituted an organizational sign-on scheme in which users in the organization may access multiple applications 130*a*-130*n* through entry of their single sign-on credentials. In these examples, users in the organization may input their single sign-on credentials once to access multiple applications 130*a*-130*n* (e.g., services, websites, etc.). In other words, the users may access the multiple applications 130*a*-130*n* without having to log on individually to each of the multiple applications 130*a*-130*n* through entry of their single sign-on credentials. This may be accomplished through use of an authentication token that may be passed to the applications 130*a*-130*n*, although other forms of authentication may be employed. In some examples, the backend entity 120 may store the user's credentials and may use the user's credentials for initial authentication and may translate the credentials for use in enabling the users to access the applications 130*a*-130*n*.

In instances in which the users may access the multiple applications 130*a*-130*n* through entry of their single sign-on credentials, the organization, e.g., the backend entity 120 of the organization, may maintain a list of applications 130*a*-130*n* that the users are enabled to access through entry of their single sign-on credentials. As such, the users may enter personal credentials to access applications that are outside of the list of applications 130*a*-130*n*. In many instances, organizations may prefer to enable the single sign-on for the applications 130*a*-130*n* that the users access as this may enable the backend entity 120 to track which the applications 130*a*-130*n* the users are accessing. This may also enable the backend entity 120 to reduce vulnerabilities due to, for instance, weak passwords, access to certain applications, etc.

The processor 104 may execute the instructions 204 to output a trace that indicates an identification of the application 130*a* that was accessed and the type of the credential supplied to access the application 130*a*. Particularly, the processor 104 may output the trace to the backend entity 120. The backend entity 120 may gather the outputted traces from a plurality of apparatuses 102 and may determine whether to enable certain applications 130*a*-130*n* to be accessed through entry of the single sign-on credentials based on the gathered outputted traces from the plurality of apparatuses 102. The backend entity 120 may also analyze the traces for other purposes, such as to determine a root cause of failure to access a particular application through entry of the single sign-on credentials. Various operations that the backend entity 120 may perform are discussed in greater detail herein.

According to examples, the processor 104 may determine that the user provided sensitive data, such as personally identifiable information, private data, secret data, and/or the like, to the application 130a. The user may have provided the sensitive data to access the application 130a and/or during access with the application 130a. For instance, the agent 110 may be programmed to identify when the user enters the sensitive data through the portal 108 based on the provided data matching certain predefined patterns. The personally identifiable information may include any information that may permit the identity of the user to be reasonably inferred directly or indirectly. The sensitive data may include, for instance, a username, a password, a social security number, a driver's license number, financial information, medical information, home address of the user, a date of birth, and/or the like.

In these examples, the processor 104 may remove the sensitive data from the trace that is outputted to the backend entity 120. Thus, for instance, the processor 104 may remove the password and the user name that the user entered to access the application 130a from the trace prior to the trace being outputted to the backend entity 120. In addition or alternatively, the processor 104 may obfuscate the sensitive data and may include the obfuscated sensitive data in the trace outputted to the backend entity 120. The processor 104 may apply any suitable obfuscation operation on the sensitive data, such as, substitution, shuffling, number and date variance, encryption, nulling out or deletion, masking out of the characters in the sensitive data, and/or the like.

According to examples, the processor 104 may determine whether a user accessed a predefined application 130a among a plurality of predefined applications that are to be traced. In addition, the processor 104 may determine whether the first credential type or the second credential type was supplied to access the application 130a based on a determination that the user accessed the predefined application 130a. In these examples, the processor 104 may output the trace regarding the application and the credential type for certain ones of the applications that the user accessed through the portal 108. For instance, the processor 104 and/or the agent 110 may be instructed to determine whether an accessed application 130a matches an application identified in a list of predefined applications.

In some examples, the backend entity 120 may inform the processor 104 and/or the agent 110 of the list of predefined applications, which the backend entity 120 may update over time. That is, the processor 104 and/or the agent 110 may receive an update to the list (or equivalently, plurality) of predefined applications and may update the list of predefined applications based on the received update. The applications in the list of predefined applications may include those applications that the backend entity 120 may wish to track for purposes of troubleshooting, data logging, consideration for access via the single sign-on process, and/or the like, which may change over time.

According to examples, instead of outputting traces corresponding to all of the applications 130a-130n that the user accessed through the portal 108, the processor 104 may selectively output traces corresponding to the applications in the list of predefined applications. That is, for instance, the processor 104 may discard traces collected through the agent 110 corresponding to applications other than the applications in the list of predefined applications. By doing so, the processor 104 may intelligently track the applications, which may reduce the amount of data that is outputted to the backend entity 120.

In some examples, the backend entity 120 may gather the outputted traces from a plurality of apparatuses 102 to determine whether to enable certain applications to be accessed through entry of the single sign-on credentials based on the gathered outputted traces from the plurality of apparatuses. For instance, the backend entity 120 may have determined that a number of users have been accessing the application 130a through entry of their personal credentials and that the application 130a should thus be accessed through entry of their single sign-on credentials. In these examples, the backend entity 120 may have included the application 130a in the list of predefined applications and may have updated the processor 104 and/or the agent 110 with the list including the application 130a. As a result, a next time that the user accesses the application 130a, the user may access the application 130a following entry of the single sign-on credentials through the portal 108, e.g., without entering their personal credentials directly to the application 130a.

Figure 3:
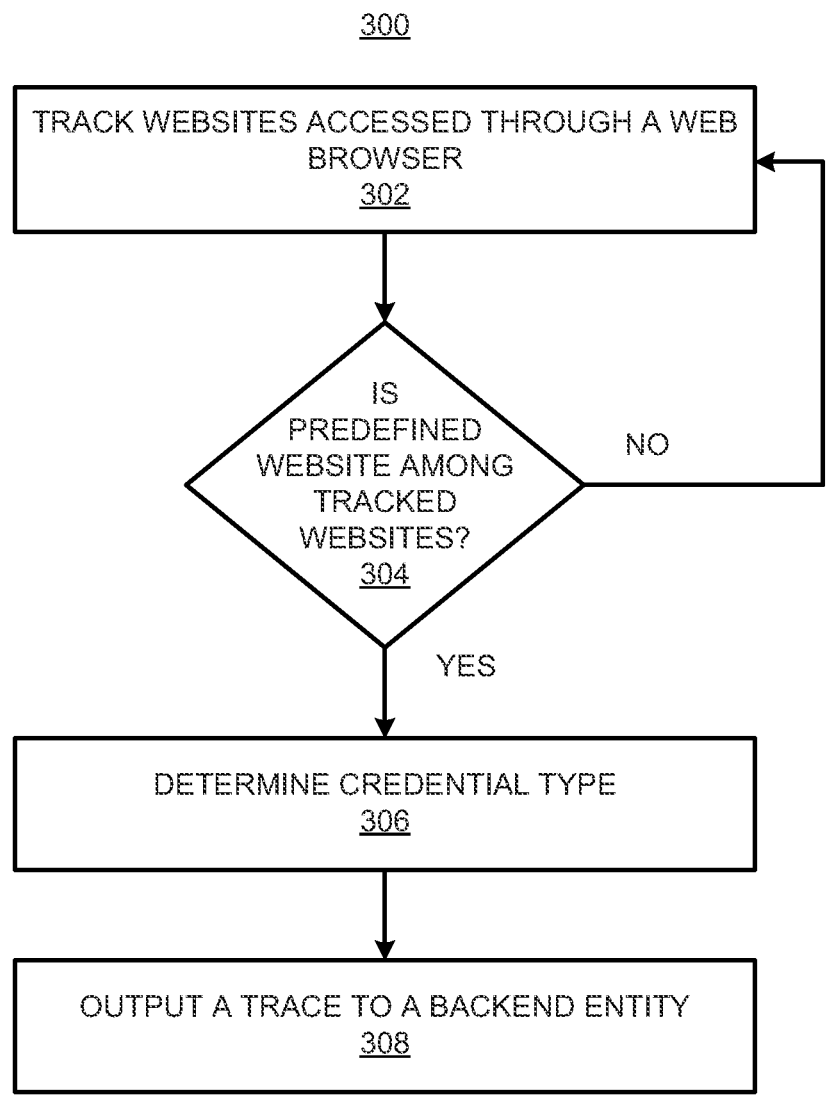
FIG. 3 depicts a flow diagram of a method for determining whether a predefined website was accessed and for outputting a trace indicating that the predefined website was accessed and a type of credential that was supplied to access the predefined website, in accordance with an embodiment of the present disclosure.

Various manners in which the processor 104 of the apparatus 102 may operate are discussed in greater detail with respect to the method 300 depicted in FIG. 3. Particularly, FIG. 3 depicts a flow diagram of a method 300 for determining whether a predefined website 130a was accessed and for outputting a trace indicating that the predefined website 130a was accessed and a type of credential that was supplied to access the predefined website 130a, in accordance with an embodiment of the present disclosure. It should be understood that the method 300 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 104 may track websites 130a-130n accessed through a web browser 108, which may be equivalent to the portal 108 on an apparatus 102. In some examples, an agent 110 on the web browser 108 may track the websites 130a-130n that a user accesses via the web browser 108 as discussed herein. The agent 110 may be user controllable and the agent 110 may track the websites 130a-130n while the agent 110 is activated by the user.

At block 304, the processor 104 may determine whether a predefined website 130a is among the tracked websites. The predefined website 130a may a website that is within a list of predefined websites. A backend entity 120 or a user of the backend entity 120 may have provided the list of predefined websites to the processor 104 and/or the agent 110. The list of predefined websites may include those websites that the backend entity 120 or user of the backend entity 120 may wish to have tracked for any of the purposes discussed herein. In some examples, the processor 104 and/or the agent 110 may receive an update to the list of predefined websites and the processor 104 and/or the agent 110 may update the list of predefined websites based on the received update.

Based on a determination that the tracked websites do not include the predefined website 130a, the processor 104 may continue to track the websites at block 302. In addition, the processor 104 may continue to determine whether any of the websites in the list of predefined websites has been accessed at block 304. For those websites that are accessed but are not in the list of predefined websites, the processor 104 may discard traces corresponding to those websites.

Based on a determination that a predefined website 130a is among the tracked websites, e.g., the user accessed a website 130a in the list of predefined websites, at block 306, the processor 104 may determine which of a first credential type and a second credential type a user of the web browser 108 provided to the predefined website 130a. As discussed herein, the first credential type may include a set of personal credentials of the user and the second credential type may include a set of single sign-on credentials that the user uses to access multiple websites through entry of the single sign-on credentials.

At block 308, the processor 104 may output a trace to a backend entity 120 that indicates whether the user provided the first credential type or the second credential type to the predefined website 130a. In this regard, the processor 104 may output the trace to the backend entity 120 indicating that the predefined website 130a was accessed and the type of credential the user supplied to access the predefined website 130a.

In some examples, the processor 104 may, based on a determination that the user accessed the predefined website 130a, determine that the user submitted personally identifiable information to the predefined website 130. In addition, the processor 104 may remove the personally identifiable information from the outputted trace. In other examples, the processor 104 may obfuscate the personally identifiable information and may include the obfuscated version of the personally identifiable information in the outputted trace. In any of these examples, the backend entity 120 may not receive a clear version of the user's personally identifiable information.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
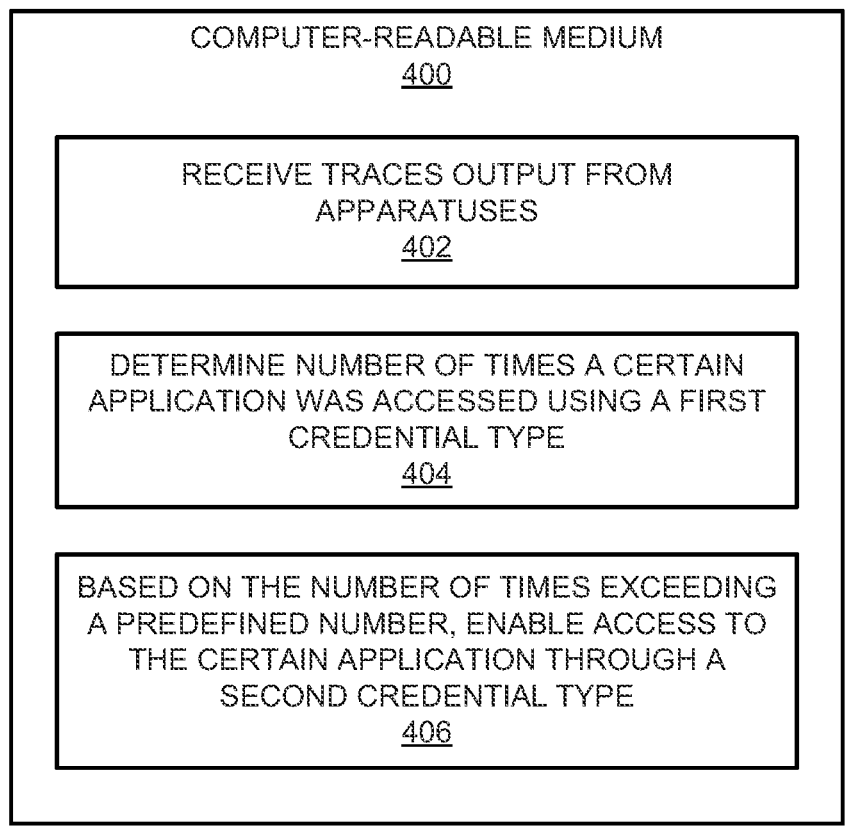
FIG. 4 shows a block diagram of a computer-readable medium that may have stored thereon computer-readable instructions for determining that access to a certain application is to be enabled through entry of single sign-on credentials, in accordance with an embodiment of the present disclosure.

Turning now to FIG. 4, there is shown a block diagram of a computer-readable medium 400 that may have stored thereon computer-readable instructions for determining that access to a certain application 130a is to be enabled through entry of single sign-on credentials, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-406 that a processor, such as a processor of the backend entity 120 depicted in FIG. 1, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to receive a plurality of traces outputted from a plurality of apparatuses 102. Each of the received plurality of traces may indicate that an application 130a accessed on the apparatus 102. The received plurality of traces may also indicate whether a first credential type or a second credential type was used to access the application 130a. The first credential type may include a set of personal credentials of a user and the second credential type may include a set of single sign-on credentials that the user uses to access multiple applications through entry of the single sign-on credentials. In some examples, each of the received plurality of traces includes traces from which personally identifiable information of the user is omitted and/or obfuscated.

The processor may fetch, decode, and execute the instructions 404 to determine a number of times that a certain application 130a was accessed using the first credential type. In other words, the processor may analyze the plurality of traces received from the apparatuses 102 to identify the number of times each of the applications identified in the traces were accessed through use of the first credential type.

The processor may fetch, decode, and execute the instructions 406 to, based on a determination that the determined number of times exceeds a predefined number, enable access to the certain application 130a through entry by users of the second credential type. In other words, the processor may enable users to enter their single sign-on credentials to access the certain application 130a based on the certain application 130a being accessed at least the predefined number of times. The predefined number of times may be defined by an administrator, IT personnel, and/or the like.

According to examples, the processor, e.g., the processor of the backend entity 120, may maintain a list of applications that the users of the apparatuses 102 are enabled to access through entry of the second credential type and may add the certain application 130a into the list of applications. As discussed herein, the processor may use tokens or other manners to enable the access to the applications in the list of applications through entry of the single sign-on credentials. In some examples, the processor of the backend entity 120 may generate a report that may include recommendations regarding which of the applications 130a-130n are made to be accessible via entry of the single sign-on credentials and may output the report to a user such that the user may take an action on the applications 130a-130n.

According to examples, each of the received plurality of traces may include a trace corresponding to a set of predefined applications. In these examples, the instructions may cause the processor to output an update to the set of predefined applications to the plurality of apparatuses based on the set of predefined applications being updated.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations.

Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
determine that an application was accessed through a portal;
based on a determination that the application was accessed through the portal, determine whether a first credential type or a second credential type was supplied to access the application, wherein the first credential type comprises a set of personal credentials of a user and the second credential type comprises a set of single sign-on credentials that the user uses to access multiple applications; and
output a trace that indicates:
an identification of the application that was accessed; and
the type of the credential supplied to access the application, wherein a backend entity is to analyze the identification of the application and the type of credential supplied to access the application indicated in the trace.

2. The apparatus of claim 1, wherein the instructions cause the processor to:
determine whether the user accessed a predefined application among a plurality of predefined applications that are to be traced; and
determine whether the first credential type or the second credential type was supplied to access the application based on a determination that the user accessed the predefined application.

3. The apparatus of claim 1, wherein the portal comprises a web browser, and wherein the instructions cause the processor to:
determine, through an agent executing on the web browser, whether the user accessed the application.

4. The apparatus of claim 3, wherein the instructions cause the processor to:
determine whether the user accessed the application in response to the agent on the web browser being activated by a user.

5. The apparatus of claim 3, wherein the instructions cause the processor to:
track a plurality of applications that the user accessed through the web browser, wherein the application is an application in the tracked plurality of applications; and
discard traces corresponding to the plurality of applications other than the application.

6. The apparatus of claim 5, wherein the instructions cause the processor to:
receive an update to the plurality of applications; and
update the plurality of applications based on the received update.

7. The apparatus of claim 1, wherein the instructions cause the processor to:
based on a determination that the user accessed the application, determine that the user provided personally identifiable information to the application; and
remove the personally identifiable information from the outputted trace.

8. The apparatus of claim 1, wherein the instructions cause the processor to:
based on a determination that the user accessed the application, determine that the user provided personally identifiable information to the application; and
obfuscate the personally identifiable information; and
include the obfuscated personally identifiable information in the outputted trace.

9. The apparatus of claim 1, wherein the instructions cause the processor to:
output the trace to the backend entity, wherein the backend entity is to gather the outputted traces from a plurality of apparatuses and to determine whether to enable certain applications to be accessed through entry of the single sign-on credentials based on the gathered outputted traces from the plurality of apparatuses.

10. The apparatus of claim 9, wherein the backend entity enabled access to the application through entry of the single sign-on credentials and wherein the user is to access the application through entry of the single sign-on credentials.

11. A method comprising:
tracking, by a processor, web sites accessed through a web browser on an apparatus;
determining, by the processor, whether a predefined web site is among the tracked web sites;
based on a determination that the predefined website is among the tracked websites, determining, by the processor, which of a first credential type and a second credential type a user of the web browser provided to the predefined website, wherein the first credential type comprises a set of personal credentials of the user and the second credential type comprises a set of single sign-on credentials that the user uses to access multiple websites; and
outputting, by the processor, a trace to a backend entity that indicates whether the user provided the first credential type or the second credential type to the predefined website.

12. The method of claim 11, wherein tracking the accessed websites comprises tracking the accessed websites through an agent on the web browser, wherein activation of the agent is user controllable, and wherein the accessed websites are tracked while the agent is activated by the user.

13. The method of claim 11, further comprising:
discarding traces corresponding to the web sites other than the predefined web site.

14. The method of claim 11, wherein the predefined website comprises a website among a list of predefined websites that are to be traced, the method further comprising:
receiving an update to the list of predefined websites; and
updating the list of predefined websites based on the received update.

15. The method of claim 11, further comprising:
based on a determination that the user accessed the predefined website, determining that the user submitted personally identifiable information to the predefined website; and
removing the personally identifiable information from the outputted trace.

16. The method of claim 11, further comprising:
based on a determination that the user accessed the predefined website, determining that the user submitted personally identifiable information to the predefined website;
obfuscating the personally identifiable information; and including an obfuscated version of the personally identifiable information in the outputted trace.

* * * * *